(12) United States Patent
Maeda et al.

(10) Patent No.: US 6,584,065 B1
(45) Date of Patent: Jun. 24, 2003

(54) INFORMATION RECORDING MEDIUM APPARATUS FOR FORMING THE SAME AND INFORMATION RECORDING AND REPRODUCING SYSTEMS

(75) Inventors: Takanori Maeda, Tsurugashima (JP); Ikuya Kikuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 200 days.

(21) Appl. No.: 09/729,913

(22) Filed: Dec. 6, 2000

(30) Foreign Application Priority Data

Dec. 7, 1999 (JP) ............................................. 11-347820

(51) Int. Cl.$^7$ ................................................. G11B 7/00
(52) U.S. Cl. ................................ 369/275.1; 369/47.53; 369/53.45; 369/59.1
(58) Field of Search ............................... 369/47.1, 47.36, 369/47.41, 47.46, 47.5, 47.53, 53.1, 53.2, 53.22, 53.37, 53.45, 59.1, 59.11, 275.1

(56) References Cited

U.S. PATENT DOCUMENTS 6,381,208 B1 * 4/2002 Abe et al. ............... 369/112.01

* cited by examiner

Primary Examiner—Muhammad Edun
(74) Attorney, Agent, or Firm—Sughrue Mion, PLLC

(57) ABSTRACT

An information recording at a high density to an information recording medium and a proper reproduction of information which has been recorded on the information recording medium at a high density are realized. Optical characteristics of an information recording medium are measured and information regarding the measured optical characteristics is previously recorded in a proper area on the information recording medium. When an information recording system records information to the information recording medium on which the information regarding the optical characteristics has been recorded, the information regarding the optical characteristics is read and a proper information recording state is adjusted on the basis of the information regarding the optical characteristics, thereby allowing the information recording to be performed. When an information reproducing system reproduces the information from the information recording medium on which the information regarding the optical characteristics has been recorded, the information regarding the optical characteristics is read and a proper information reproducing state is adjusted on the basis of the information regarding the optical characteristics, thereby allowing the information reproduction to be performed.

12 Claims, 8 Drawing Sheets

INFORMATION RECORDING MEDIUM APPARATUS FOR FORMING THE SAME AND INFORMATION RECORDING AND REPRODUCING SYSTEMS

BACKGROUND OF THE INVENTION

1. Field of the Invention

The invention relates to an information recording medium in which information is optically recorded thereto or reproduced therefrom, an apparatus for forming the information recording medium, an information recording system for optically recording information to the information recording medium, and an information reproducing system for optically reproducing information from the information recording medium.

2. Description of the Related Art

As information recording media in which information is optically recorded thereto or reproduced therefrom, a CD (Compact Disc) and a DVD (Digital Video Disc or Digital Versatile Disc) are known. Besides the information read only CD and DVD, a CD and a DVD to which information can be recorded once and a CD and a DVD from which information can be erased and to which information can be recorded again have been developed.

For example, as schematically shown in a cross sectional view of FIG. 11, each information recording medium (hereinafter, referred to as an optical disc) 1 has a laminated structure comprising: a transparent substrate 1c as a relatively thick light transmitting layer having a function of supporting an optical disc main body and a function of transmitting light; a relatively thin protecting plate 1a positioning on the reverse side of the optical disc 1 as compared with the transparent substrate 1c; and a recording layer 1b arranged between the transparent substrate 1c and protecting layer 1a. By irradiating a laser beam from the outside onto the transparent substrate 1c side, information recording to the recording layer 1b by an information recording system or an information reproduction from the recording layer 1b by an information reproducing system is performed.

Research and development of a large capacity optical disc has progressed, and also an information reproducing system for such a optical disc has progressed in which high density recording can be performed on the optical disc.

To realize high density recording, research and development of a material and structure of an optical disc, a manufacturing method thereof, and the like has progressed. On the side of the information recording system and information reproducing system, a method has been considered whereby high density recording and reproduction of information recorded at a high density by a laser beam of a small irradiating diameter are performed by increasing a numerical aperture (NA) of an objective lens for irradiating the laser beam to a recording layer through a transparent substrate.

When optical discs are manufactured, however, sometimes a thickness spot (uneven thickness) occurs on the transparent substrate or, even if a thickness of the whole transparent substrate is even, the thickness is different from the standardized thickness, or the like. If the laser beam is irradiated through the objective lens of a large numerical aperture NA to an optical disc having a transparent substrate with a thickness error or unevenness, spherical aberration easily occurs in the optics for the laser beam because of the thickness error of the transparent substrate. There is such a problem that precision of the information recording and that of the information reproduction cannot be improved.

To properly perform high density recording and reproduction of the information recorded at a high density, it should be considered in various optical characteristics. The characteristics include birefringence of the transparent substrate, pigment sensitivity wavelength dependency and reflectance which are used in the recording layer, power of the laser beam, and the like besides the adverse influence due to the spherical aberration in association with the realization of the high NA of the objective lens. Thus, it is important to suppress the adverse influence which is caused by a variation of those optical characteristics between the optical discs or by unevenness of those optical characteristics existing in each optical disc.

OBJECTS AND SUMMARY OF THE INVENTION

The invention is made to solve the problems and it is an object of the invention to provide an information recording medium, an apparatus for forming the medium, an information recording system, and an information reproducing system, in which a high density recording or a reproduction of information recorded at a high density can be properly performed.

Another object of the invention is to provide an information recording medium, an apparatus for forming the medium, an information recording system, and an information reproducing system, in which the realization of a high NA for performing a high density recording or a reproduction of information recorded at a high density can be promoted.

To accomplish the above objects, according to an aspect of the invention, there is provided an information recording medium which has a light transmitting layer and a recording layer and in which an information recording to the recording layer or an information reproduction from the recording layer by a light which is irradiated from the light transmitting layer side is performed by an information recording system or an information reproducing system, wherein information regarding at least optical characteristics of the light transmitting layer has previously been recorded in the recording layer.

According to the information recording medium with the construction, when the information recording is performed by the information recording system, the information recording system previously optically reads the information regarding the optical characteristics and enables a compensating process for properly performing the information recording to be performed on the basis of the information regarding the read-out optical characteristics. For example, even in the case where a value of NA of an objective lens provided for the information recording system is set to a high value in association with the realization of the high density of the information recording medium, therefore, the optical system having the objective lens is automatically adjusted on the basis of the information of the optical characteristics, thereby enabling the high density recording to the information recording medium to be performed. When the information reproduction is performed by the information reproducing system, the information reproducing system previously optically reads the information regarding the optical characteristics, thereby enabling the compensating process for properly performing the information reproduction to be performed on the basis of the information regarding the read-out optical characteristics. For example, even in the case where a value of NA of an objective lens provided for the information reproducing system is set to a high value in association with the realization of the high density of the information recording medium, the optical system having the objective lens is automatically adjusted on the basis of the information of the optical characteristics, thereby enabling the information recorded on the information recording medium at a high density to be properly reproduced.

According to another aspect of the invention, there is provided an apparatus for forming an information recording medium which has a light transmitting layer and a recording layer and in which an information recording to the recording layer or an information reproduction from the recording layer by a light which is irradiated from the light transmitting layer side is performed by an information recording system or an information reproducing system, comprising: measuring means for measuring optical characteristics of the information recording medium; and recording means for previously recording measurement information measured by the measuring means into the recording layer.

According to the forming apparatus of the information recording medium with the construction, the optical characteristics of the manufactured information recording medium are measured and the information regarding the optical characteristics is previously recorded to the information recording medium. When the information recording to the information recording medium formed as mentioned above is performed by the information recording system, the information recording system previously optically reads the information regarding the optical characteristics and enables the compensating process for properly performing the information recording to be performed on the basis of the information regarding the read-out optical characteristics. For example, even in the case where a value of NA of an objective lens provided for the information recording system is set to a high value in association with the realization of the high density of the information recording medium, an optical system having the objective lens is automatically adjusted on the basis of the information of the optical characteristics, thereby enabling the high density recording to the information recording medium to be performed.

According to the forming apparatus of the information recording medium, when the information reproduction of the formed information recording medium is performed by the information reproducing system, the information reproducing system previously optically reads the information regarding the optical characteristics, thereby enabling the compensating process for properly performing the information recording to be performed on the basis of the information regarding the read-out optical characteristics. For example, even in the case where a value of NA of an objective lens provided for the information reproducing system is set to a high value in association with the realization of the high density of the information recording medium, the optical system having the objective lens is automatically adjusted on the basis of the information of the optical characteristics, thereby enabling the information recorded on the information recording medium at a high density to be properly reproduced.

According to still another aspect of the invention, there is provided an information recording system for recording information to an information recording medium which has a light transmitting layer and a recording layer and in which information regarding at least optical characteristics of the light transmitting layer has previously been recorded in the recording layer, comprising: reading means for optically reading the information regarding the optical characteristics recorded in the recording layer; and optical characteristics compensating means for compensating a deviation of the optical characteristics which is caused when the information is recorded to the information recording medium on the basis of the information regarding the optical characteristics read by the reading means and performing the information recording.

According to the information recording system with the construction, when the information recording is performed, the information regarding the optical characteristics recorded on the information recording medium is optically read, and the compensating process for properly performing the information recording can be performed on the basis of the information regarding the read-out optical characteristics. For example, consequently, even in the case where a value of NA of an objective lens provided for the information reproducing system is set to a high value in association with the realization of the high density of the information recording medium, an optical system having the objective lens is automatically adjusted on the basis of the optical characteristics, thereby enabling the high density recording to the information recording medium to be properly performed.

According to further another aspect of the invention, there is provided an information reproducing system for reproducing information from an information recording medium which has a light transmitting layer and a recording layer and in which the information regarding at least optical characteristics of the light transmitting layer has previously been recorded in the recording layer, comprising: reading means for optically reading the information regarding the optical characteristics recorded in the recording layer; and optical characteristics compensating means for compensating a deviation of the optical characteristics which is caused when the information is reproduced from the information recording medium on the basis of the information regarding the optical characteristics read by the reading means and performing the information reproduction.

According to the information reproducing system with the construction, when the information reproduction is performed, the information regarding the optical characteristics recorded on the information recording medium is optically read, and the compensating process for properly performing the information reproduction can be performed on the basis of information regarding the read-out optical characteristics. For example, consequently, even in the case where a value of NA of an objective lens provided for the information reproducing system is set to a high value in association with the realization of the high density of the information recording medium, the optical system having the objective lens is automatically adjusted on the basis of the optical characteristics, thereby enabling the information to be reproduced from the information recording medium on which the information has been recorded at a high density.

DETAILED DESCRIPTION OF THE PREFERRED EMBODIMENT

An embodiment of the invention will now be described hereinbelow with reference to the drawings. As an information recording medium of the embodiment, explanation will be made with respect to a phase change optical disc on which information is recorded by changing a phase of a crystal or amorphous layer by a light energy or an optical disc having a recording layer formed by a pigment. More specifically, a WORM-type optical disc such as CD, DVD, or the like to which information can be recorded once or a rewritable type optical disc such as CD, DVD, or the like in which information can be erased and recorded again will be described.

Figure 11:
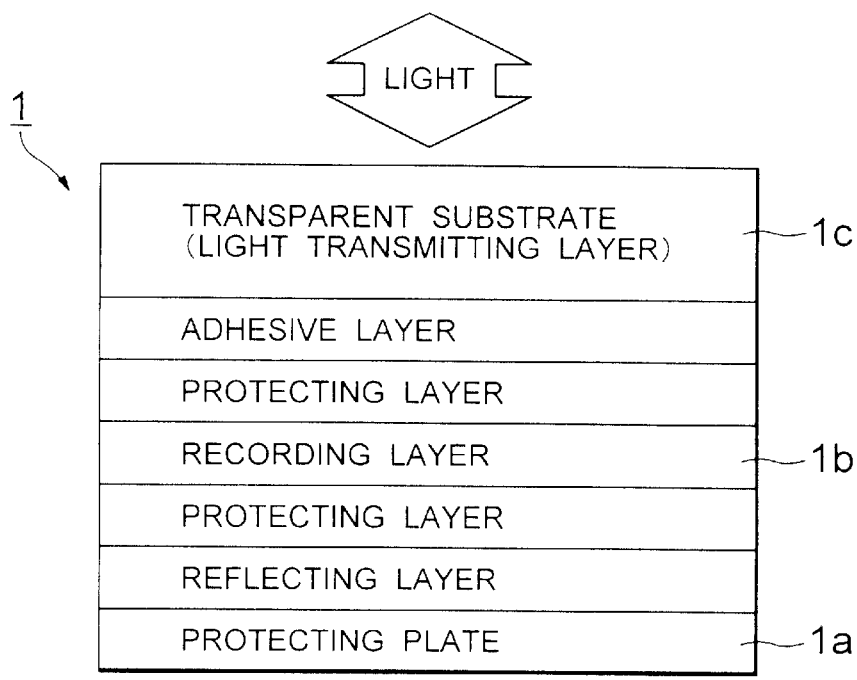
FIG. 11 is a cross sectional view schematically showing a cross sectional structure of an optical disc.

In a manner similar to, for example, the disc shown in FIG. 11, the WORM-type optical disc has a laminated structure in which the recording layer 1b which irreversibly changes is arranged between the transparent substrate 1c as a light transmitting layer and the protecting plate 1a. By irradiating a laser beam through the transparent substrate 1c, information recording to the recording layer 1b or information reproduction from the recording layer is performed.

In a manner similar to, for example, the disc shown in FIG. 11, the rewritable type optical disc has a laminated structure in which the recording layer 1b which reversibly changes is arranged between the transparent substrate 1c and protecting plate 1a. By irradiating a laser beam through the transparent substrate 1c, information recording to the recording layer 1b or information reproduction from the recording layer is performed.

Figure 1:
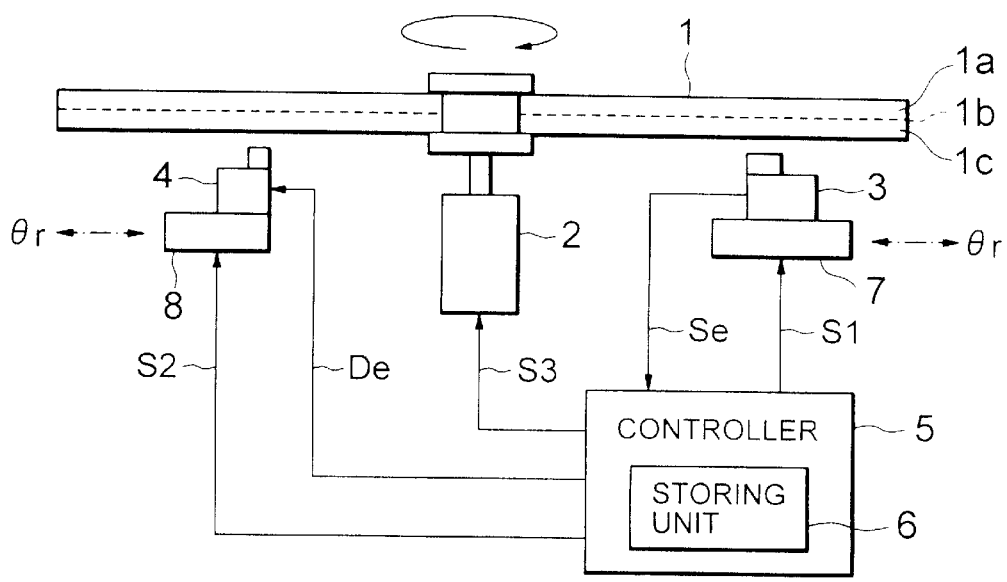
FIG. 1 is a constructional diagram of a forming apparatus of an information recording medium according to an embodiment.

FIG. 1 is a block diagram showing a construction of a forming apparatus for forming the optical disc 1 of the embodiment by recording spherical aberration correction information, which will be explained hereinlater, onto the WORM-type optical disc or the rewritable type optical disc.

In FIG. 1, the forming apparatus is constructed by: a drive motor 2 for holding the optical disc 1 and rotating; a first optical head 3; a second optical head 4; a controller 5 having a storing unit 6; and conveying mechanisms 7 and 8 for moving the first and second optical heads 3 and 4 forwards and backwards in a radial direction "r" of the optical disc 1, respectively.

The first optical head 3 is provided to initialize the optical disc 1 and detect a thickness error of the transparent substrate 1c of the optical disc 1. The second optical head 4 is provided to record the spherical aberration correction information into the recording layer 1b of the optical disc 1.

The controller 5 comprises: a digital signal processor (DSP) for performing a digital arithmetic operation; and a microprocessor (MPU) for controlling the operation of the whole forming apparatus by executing a predetermined system program. The controller 5 controls rotational speed of the drive motor 2 by a control signal S3 and controls the conveying mechanisms 7 and 8 by control signals S1 and S2, thereby controlling the first and second optical heads 3 and 4 for movement in the radial direction "r" of the optical disc 1 while rotating the optical disc 1.

More specifically, the controller 5 moves the first optical head 3 in the radial direction "r" of the optical disc 1 while controlling the rotational speed of the drive motor 2 at the time of the initializing process and the detecting process of the thickness error by the first optical head 3. Each time a facing position of the first optical head 3 for the optical disc 1 is deviated, a detection signal Se which is generated from the first optical head 3 is supplied to the controller. The thickness error of the transparent substrate 1c is arithmetically computed on the basis of the detection signal Se. The spherical aberration correction information (hereinafter, referred to as spherical aberration correction data) for correcting a spherical aberration occurring on the transparent substrate 1c is arithmetically computed on the basis of a result of the arithmetic operation of the thickness error. That is, the thickness error of the transparent substrate 1c is arithmetically computed for every facing position of the first optical head 3 for the optical disc 1. Further, the spherical aberration correction data is arithmetically computed on the basis of the thickness error. The storing unit 6 is constructed by a semiconductor memory or the like for temporarily storing the thickness error and the spherical aberration correction data which are obtained by those arithmetic operating processes.

Further, when the arithmetic operating processes of the thickness error and the spherical aberration correction data with respect to the whole area of the transparent substrate 1c are completed, the controller 5 moves the second optical head 4 in the radial direction "r" of the optical disc 1 while controlling the rotational speed of the drive motor 2, transfers spherical aberration correction data "De" stored in the storing unit 6 to the second optical head 4, and allows the data "De" to be recorded into the recording layer 1b of the optical disc 1.

Figure 2:
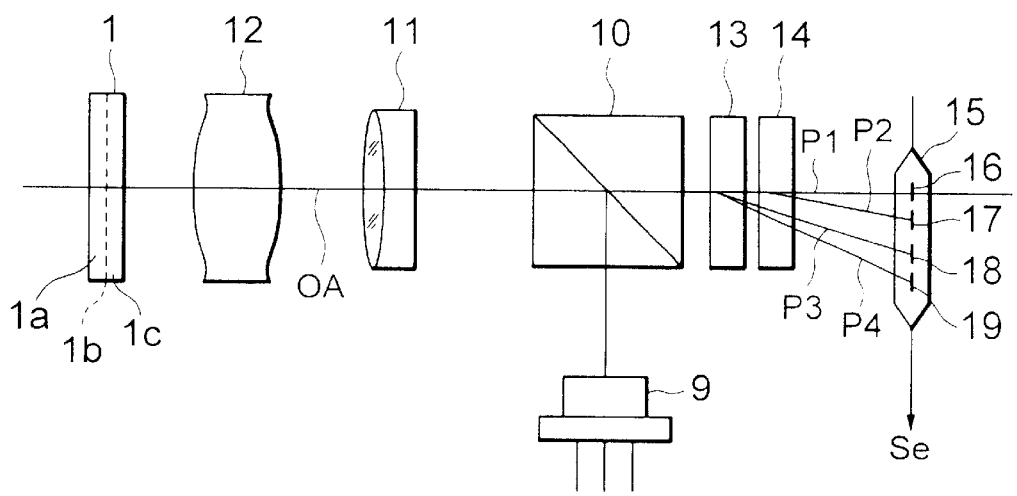
FIG. 2 is a diagram showing a construction of an optical head provided for the forming apparatus of the information recording medium.
Figure 3:
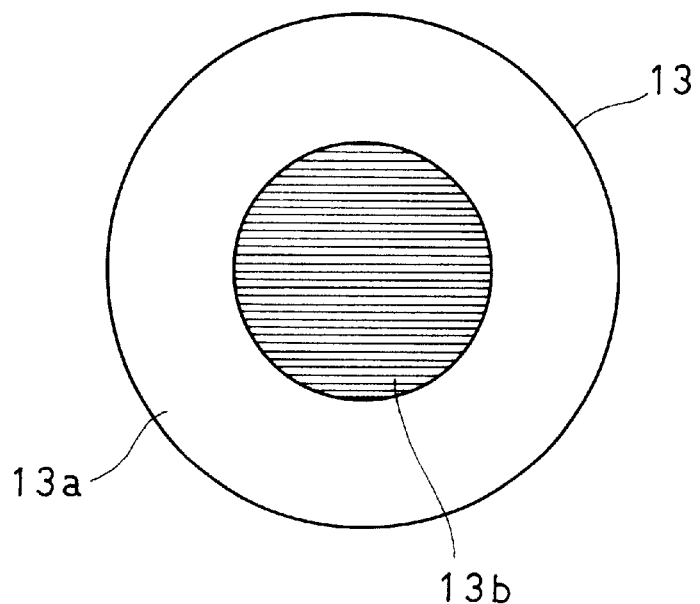
FIG. 3 is a plan view showing a shape of a first hologram device.
Figure 4:
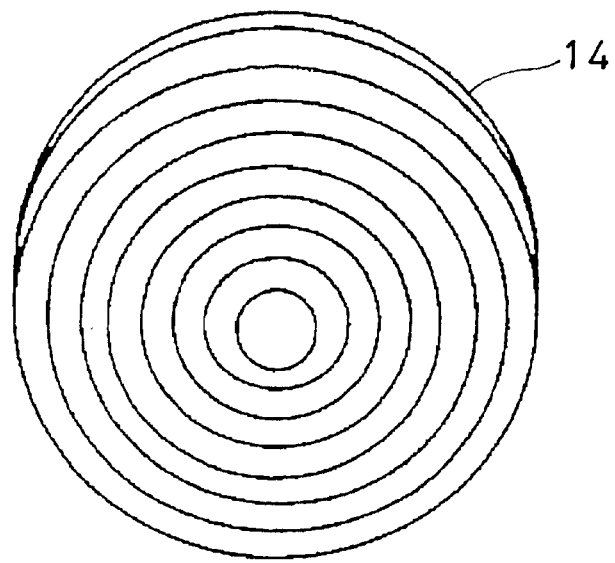
FIG. 4 is a plan view showing a shape of a second hologram device.
Figure 5:
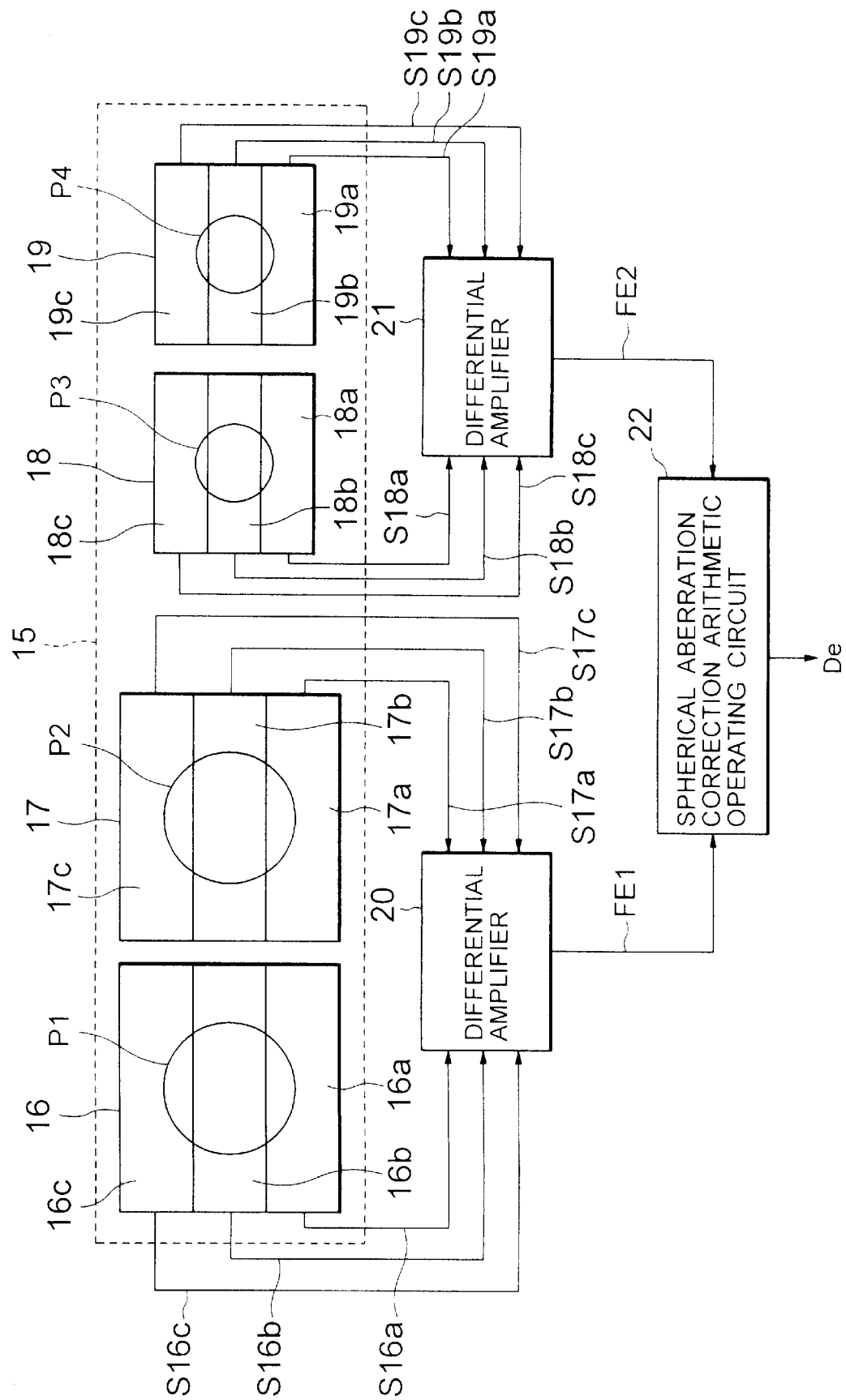
FIG. 5 is a block diagram showing a construction of a circuit for forming a thickness error and spherical aberration correction data.

The optical head 3 and a circuit to form the thickness error and the spherical aberration correction data will now be described in detail with reference to FIGS. 2 to 7. FIGS. 2 to 4 are constructional diagrams of the first optical head 3. FIG. 5 is a block diagram showing a construction of the circuit to form the thickness error and the spherical aberration correction data.

In FIG. 2, the first optical head 3 is constructed by: a light source 9 for emitting a laser beam; a beam splitter 10; a collimator lens 11; an objective lens 12; a pair of hologram devices 13 and 14; and a photodetector 15. They are arranged along an optical axis OA.

Four photosensing portions 16, 17, 18, and 19 are formed in the photodetector 15. Further, as shown in FIG. 5, three photosensing surfaces 16a, 16b, and 16c are formed on the photosensing portion 16, three photosensing surfaces 17a, 17b, and 17c are formed on the photosensing portion 17, three photosensing surfaces 18a, 18b, and 18c are formed on the photosensing portion 18, and three photosensing surfaces 19a, 19b, and 19c are formed on the photosensing portion 19, respectively.

When the laser beam is emitted from the light source 9, the laser beam is reflected by the beam splitter 10, converted to the parallel beam by the collimator lens 11, converged by the objective lens 12, and irradiated to the recording layer 1b of the optical disc 1 through the transparent substrate 1c. The laser beam (namely, reflection light) reflected by the recording layer 1b of the optical disc 1 is returned to the objective lens 12 through the transparent substrate 1c, further passes through the collimator lens 11 and beam splitter 10, is diffracted by the hologram devices 13 and 14, and received by the photodetector 15.

The first hologram device 13 is arranged perpendicularly to the optical axis OA and a transparent outer peripheral portion 13a corresponding to an effective optical path of the reflection light and a circular hologram pattern 13b smaller than the outer peripheral portion 13a are formed as shown in a plan view of FIG. 3. The hologram pattern 13b is a blazed grating having a saw-tooth like vertical sectional shape, diffracts the reflection light from the beam splitter, emphasizes the diffraction light of a predetermined degree m, and emits it. That is, assuming that a grating constant of the blazed grating is set to "d", a blaze angle is set to "θ", and a wavelength of the reflection light is set to "λ", the diffraction light of the degree m=2×d×sin θ/λ is emphasized and emitted.

In the embodiment, the hologram pattern 13b is formed in a manner such that the grating constant "d" and the blaze angle θ are set so as to emphasize the diffraction light of the degree m=1, namely, the primary light, and at the same time the reflection light of the laser beam irradiated onto the optical disc 1 passes through an inner area on the objective lens 12 where the numerical aperture NA is equal to or less than 0.31 and also passes through the pattern 13b. The outer peripheral portion 13a is formed in a manner such that the reflection light of the laser beam irradiated onto the optical disc 1 passes through a large area on the objective lens 12 where the numerical aperture NA is equal to or less than 0.85 and also passes through the pattern 13a.

The second hologram device 14 is arranged so as to face the first hologram device 13 and a concentrical diffraction pattern in which a position decentered from the center of the optical axis OA is set to the center and which functions as a concave lens is formed as shown in FIG. 4. The diffraction light from the first hologram device 13 is, therefore, irradiated toward two different focal positions and received by the photosensing portions 16, 17, 18, and 19 provided at the focal positions, respectively.

By providing the hologram devices 13 and 14 as mentioned above, the first hologram device 13 separates the reflection light from the beam splitter 10 into a 0th order light and a primary light and allows them to be transmitted to the second hologram device 14 side. The second hologram device 14 further separates the 0th order light from the first hologram device 13 into a 0th order light P1 and a primary light P2, emits the 0th order light P1 to the photosensing portion 16 side, and emits the primary light P2 to the photosensing unit 17 side, respectively. Further, the second hologram device 14 separates the primary light from the first hologram device 13 into a 0th order light P3 and a primary light P4, emits the 0th order light P3 to the photosensing unit 18 side, and emits the primary light P4 to the photosensing unit 19 side, respectively.

The photosensing surfaces 16a, 16b, and 16c formed on the photosensing portion 16 shown in FIG. 5 divisionally receive the 0th order light P1, thereby generating photoelectric conversion signals S16a, S16b, and S16c, respectively. The photosensing surfaces 17a, 17b, and 17c formed on the photosensing portion 17 divisionally receive the primary light P2, thereby generating photoelectric conversion signals S17a, S17b, and S17c, respectively. The photosensing surfaces 18a, 18b, and 18c formed on the photosensing portion 18 divisionally receive the 0th order light P3, thereby generating photoelectric conversion signals S18a, S18b, and S18c, respectively. The photosensing surfaces 19a, 19b, and 19c formed on the photosensing portion 19 divisionally receive the primary light P4, thereby generating photoelectric conversion signals S19a, S19b, and S19c, respectively. The photoelectric conversion signals S16a to S16c, S17a, to S17c, S18a to S18c, and S19a to S19c are supplied as a detection signal Se shown in FIG. 1 to differential amplifiers 20 and 21 provided in the controller 5, respectively.

The differential amplifier 20 executes an arithmetic operation of the following equation (1) on the basis of the photoelectric conversion signals S16a to S16c and S17a, to S17c and supplies an arithmetic operation result (hereinafter, referred to as a first focusing error signal) FE1 to a spherical aberration correction arithmetic operating circuit 22 provided in the controller 5. The differential amplifier 21 executes an arithmetic operation of the following equation (2) on the basis of the photoelectric conversion signals S18a to S18c and S19a to S19c and supplies an arithmetic operation result (hereinafter, referred to as a second focusing error signal) FE2 to the spherical aberration correction arithmetic operating circuit 22.

$$FE1 = (S16a + S16c - S16b) - (S17a + S17c - S17b) \quad (1)$$

$$FE2 = (S18a + S18c - S18b) - (S19a + S19c - S19b) \quad (2)$$

When the spherical aberration of the light irradiated to the optical disc 1 is small and the objective lens 12 is in an in-focusing state, spot diameters of the 0th order light P1 and the primary light P2 which are irradiated to the photosensing portions 16 and 17 are almost equal. Further, spot diameters of the 0th order light P3 and primary light P4 which are irradiated to the photosensing portions 18 and 19 are almost equal. Since the arithmetic operation of the equation (1) is performed on the basis of the photoelectric conversion signals S16a to S16c and S17a, to S17c which are generated from the photosensing portions 16 and 17, the first focusing error signal FE1 showing a defocus amount is generated. Since the arithmetic operation of the equation (2) is performed on the basis of the photoelectric conversion signals S18a to S18c and S19a to S19c which are generated from the photosensing portions 18 and 19, the second focusing error signal FE2 showing a defocus amount is generated.

The spherical aberration correction arithmetic operating circuit 22 calculates a difference between the first focusing error signal FE1 and second focusing error signal FE2 which were digitally converted by A/D converters (not shown) in accordance with the following equation (3), thereby generating difference data "We" showing the thickness error of the transparent substrate 1c. A coefficient α is a proper weight constant.

$$We = \alpha \times FE2 - FE1 \quad (3)$$

That is, the difference data "We" showing the thickness error of the transparent substrate 1c is generated on the basis of a principle which will be explained hereinbelow.

Figure 6:
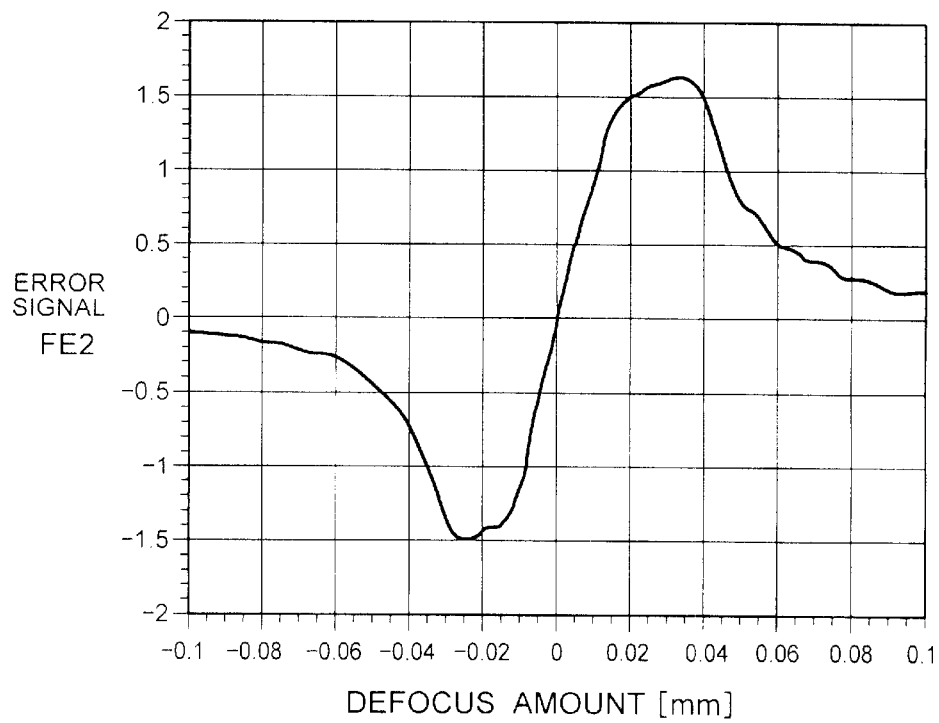
FIG. 6 is an explanatory diagram for explaining a principle for forming the thickness error and spherical aberration correction data.

First, FIG. 6 shows an actual measurement value of an amplitude change of the second focusing error signal FE2 which is obtained when the objective lens 12 is moved forwardly or backwardly to the position in the defocusing state from the in-focusing state along the optical axis OA in the case where the thickness of the transparent substrate 1c of the optical disc 1 is equal to a reference value (standardized thickness). A state at the time of the defocus amount=0 in the diagram corresponds to the in-focusing state.

Figure 7:
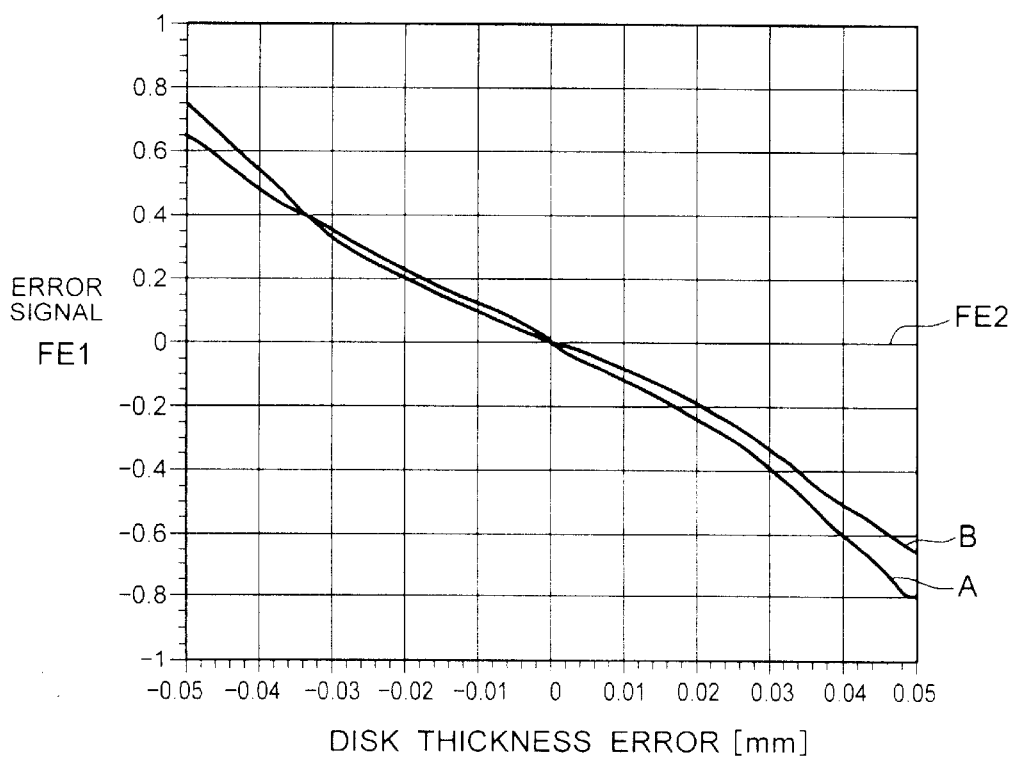
FIG. 7 is an explanatory diagram for further explaining the principle for forming the thickness error and spherical aberration correction data.

FIG. 7 shows an actual measurement value of an amplitude change of the first focusing error signal FE1 for the thickness error of the transparent substrate 1c in the case where the amplitude change of the second focusing error signal FE2 is set to a reference (shown by a straight line in the diagram). In FIG. 7, characteristics A show a change of the first focusing error signal FE1 obtained on the basis of the photoelectric conversion signals S16a, S16b, and S16c at the time when the photosensing portion 16 receives a partial reflection light (0th order light P1) transmitted through the outer peripheral portion 13a in the case where most of the reflection light is diffracted by the hologram pattern 13b of the first hologram device 13. Characteristics B show a change of the first focusing error signal FE1 obtained on the basis of the photoelectric conversion signals S16a, S16b, and S16c at the time when the photosensing portion 16 receives the reflection light (0th order light P1) and diffraction light (primary light P2) transmitted through the hologram pattern 13b and outer peripheral portion 13a of the first hologram device 13.

As will be obviously understood from the relations between FIGS. 6 and 7, by obtaining the first focusing error signal FE1 in the case where the second focusing error signal FE2 is set to a reference by the difference arithmetic operation of the equation (3), the difference data "We" can be obtained as a thickness error of each portion of the transparent substrate 1c.

Further, the spherical aberration correction arithmetic operating circuit 22 obtains the thickness error "We" of each portion of the transparent substrate 1c. Thereafter, on the basis of a threshold value THD which has been preset in accordance with an allowable range of a recording density standardized on the optical disc 1, the circuit 22 discriminates the thickness error "We" (<THD) belonging to an area in the allowable range and the thickness error "We" (≧THD) belonging to an area out of the allowable range. Further, a position of the portion of the transparent substrate 1c having the thickness error "We" (≧THD) belonging to the area out of the allowable range is detected. The spherical aberration correction data De={D(γ, φ), We} in which one set is constructed by detected position data D(γ,φ) and the data "We" of the thickness error at this position is generated and stored in the storing unit 6.

In the embodiment, the position data D(γ, φ) is generated as data of the polar coordinates system based on a rotational angle φ of the optical disc 1 and a distance γ in the radial direction "r" from the center of the optical disc 1.

Figure 8A:
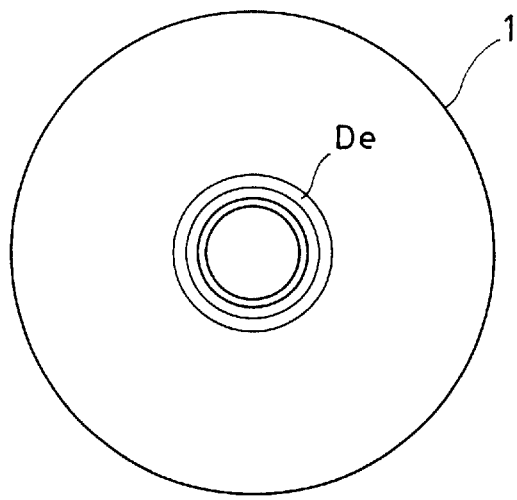
FIGS. 8A, 8B and 8C are plan views for explaining a structure of an information recording medium on which information of optical characteristics has previously been recorded.

When the generation of the spherical aberration correction data "De" is finished as mentioned above, the controller 5 rotates the optical disc 1 as mentioned above, moves the second optical head 4 in the radial direction θr, and collectively records it into a predetermined area on the inner rim side of the optical disc 1, for example, in an area near a lead-in area as shown in FIG. 8A.

As mentioned above, according to the forming apparatus, when the optical disc 1 is initialized, the thickness error of each portion of the transparent substrate 1c is previously measured, and the spherical aberration correction data "De" having the data "We" of the thickness error corresponding to the area out of the allowable range of the standardized recording density and the position data D(γ, φ) corresponding to the data "We" of the thickness error is recorded onto the optical disc 1. When the information recording or information reproduction is, therefore, performed by using an information recording system or information reproducing system, which will be explained hereinlater, with regard to the formed optical disc 1, by reading the spherical aberration correction data "De" and controlling the pickup, the influence of the spherical aberration can be suppressed. By providing an optical disc on which the spherical aberration correction data "De" has preliminarily been recorded, an optical disc which can easily suppress the influence by the spherical aberration can be provided.

Figure 8B:
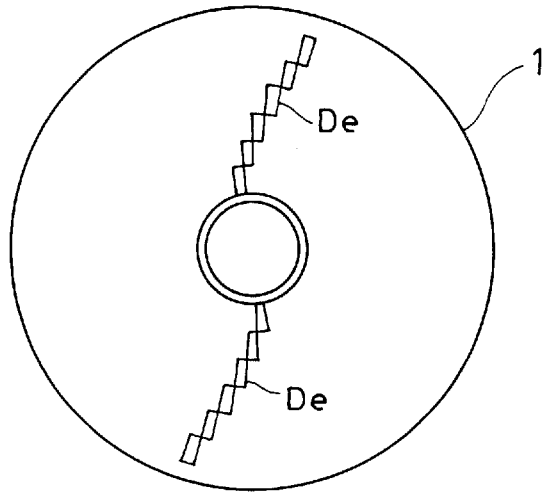
Figure 8C:
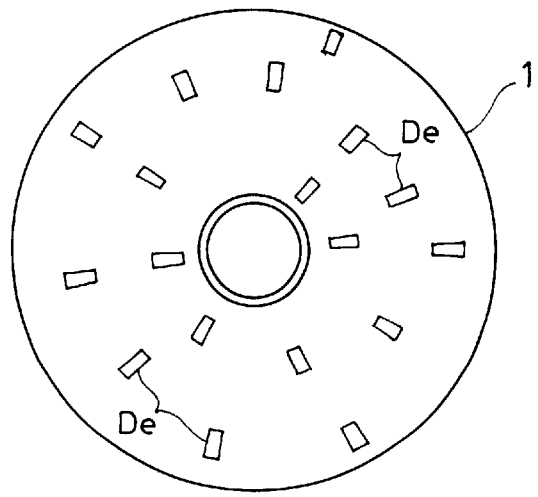

As shown in FIGS. 8B and 8C, the spherical aberration correction data De={D(γ, φ), We} can be also distributed and recorded in a range of a program area. To distinguish the data "De" from what is called contents information that is recorded in the range of the program area, the spherical aberration correction data De={D(γ, φ), We} is encoded to a special ID code or an ID code is added to the data "De" and the resultant data "De" is recorded.

The spherical aberration correction data De (We) of only the thickness error "We" can be also recorded once into a sector address portion in the program area corresponding to the position data D(γ, φ) included in the spherical aberration correction data "De" in association with sector address data and the recording of the data D(γ, φ) can be also omitted. By recording only the data "We" of the thickness error into the sector address portion where the thickness error exists as mentioned above, the recording capacity of the program area is not reduced.

It is also possible to construct the system in such a manner that the data "We" of all of the thickness errors and the position data D(γ, φ) are not finely recorded in a one-to-one corresponding relationship manner but an area where the thickness error exists is determined from a distribution of the position data D(γ, φ) is determined and the position data D(γ, φ) showing each range of the determined relatively wide area and the data "We" of each thickness error corresponding to each range are recorded in a corresponding relationship manner. By recording the data "We" of each thickness error every area which is relatively wide as mentioned above, a consumption of the recording capacity of the program area can be further reduced. Since, generally, the distribution of the thickness error of the transparent substrate 1c changes relatively gently, there is no practical problem even if the data "We" of the thickness error is recorded every relatively wide area.

In the above description of the forming apparatus, the case where the data "We" of the thickness error corresponding to the area out of the allowable range of the recording density is recorded onto the optical disc 1 has been discussed. The data "We" can be also previously recorded on the optical disc 1 together with the data "We" of the thickness error corresponding to the area in the allowable range of the recording density. The measured data of the thickness of the transparent substrate 1c can be also previously recorded on the optical disc 1 irrespective of the areas in and out of the allowable range. In this case, a distribution of the values of all data which is measured as difference data "We" is examined with respect to all of the areas of the transparent substrate 1c, a group of the difference data "We" is extracted for every common value, and a position (range) of each area of the transparent substrate 1c corresponding to those groups is specified. The position data D(γ, φ) showing each range of each area and the representative difference data "We" corresponding to each range are preliminarily collectively or dispersedly recorded in a predetermined area on the optical disc 1 as shown in FIGS. 8A, 8B and 8C in a corresponding relationship manner.

Even in the case where the data is recorded as mentioned above, the recording capacity in the program area is not largely consumed. That is, since the thickness distribution of the transparent substrate 1c generally changes relatively gently, even if the difference data "We" is recorded as spherical aberration correction data De={D(γ, φ), We} in correspondence to each relatively wide area, the number of spherical aberration correction data "De" is relatively small and the recording capacity is not largely consumed.

In the forming apparatus shown in FIG. 1, the first optical head 3 and second optical head 4 are moved by the different conveying mechanisms 7 and 8, respectively. The first optical head 3 and second optical head 4 can be mounted in one conveying mechanism and the first optical head 3 and second optical head 4 can be moved in the radial direction "r" by one conveying mechanism. The first optical head 3 and second optical head 4 can be also collectively assembled in one optical system.

A construction of the information recording system for recording information by using the optical disc 1 on which the spherical aberration correction data "De" has been recorded will now be described with reference to FIG. 9. The following explanation will now be made here with respect to a construction of a main section as a characteristic portion of the invention, because the information recording system has a construction that is common to the information recording apparatus for recording information to a conventional WORM-type or rewritable type optical disc.

Figure 9:
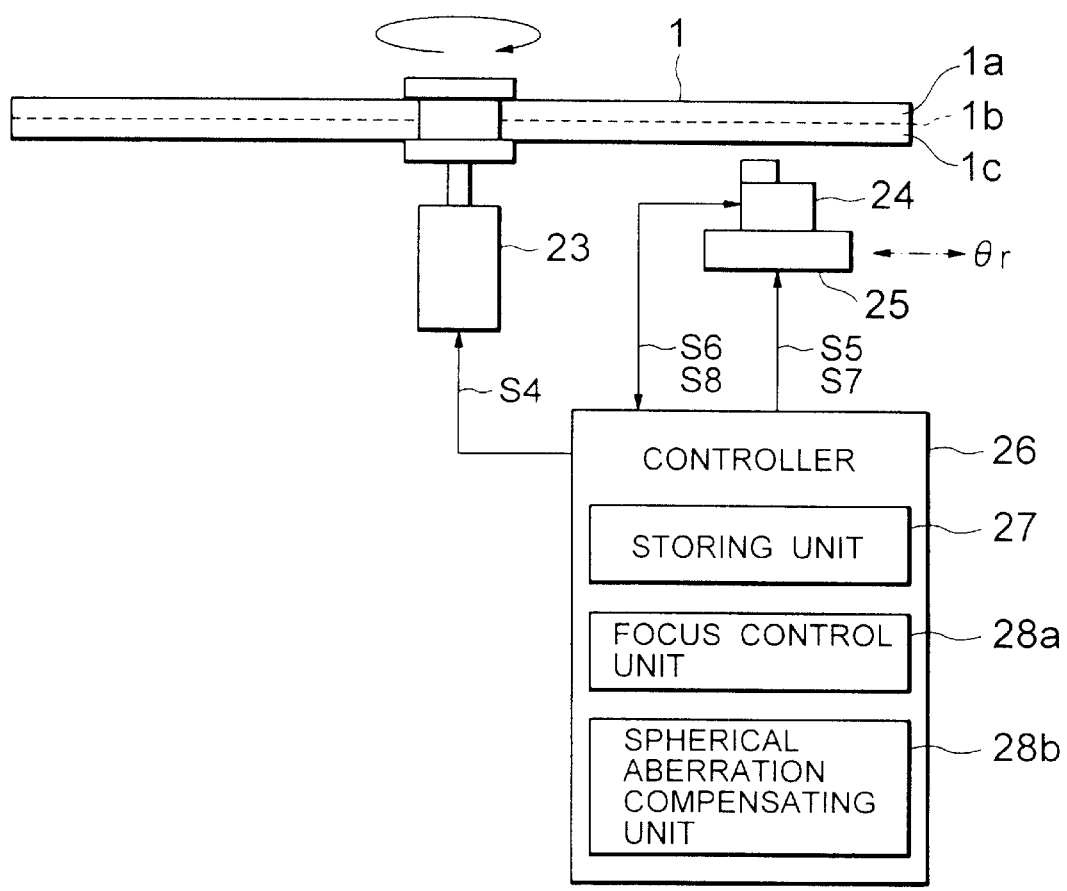
FIG. 9 is a block diagram showing a construction of an information recording system.

In FIG. 9, in a manner similar to the information recording apparatus which has been known hitherto, the information recording system is constructed by: a drive motor 23 which rotates while supporting the optical disc 1; an optical pickup 24 for recording information; a conveying mechanism 25 for moving the optical pickup 24 forwardly or backwardly in the radial direction "r" of the optical disc 1; and a controller 26 for controlling the operation of the information recording system. Further, the controller 26 has a processing function corresponding to the optical disc 1 and a storing unit 27, a focus control unit 28a, and a spherical aberration compensating unit 28b are provided.

When the start of the information recording is instructed by the user or the like, the controller 26 rotates the drive motor 23 by a control signal S4 and moves the conveying mechanism 25 from the inner rim side to the outer rim side of the optical disc 1 by a control signal S5. While moving the optical pickup 24 at a predetermined linear velocity for the optical disc 1, a laser beam (not shown) which is converged by an objective lens (not shown) in the optical pickup 24 is irradiated toward the transparent substrate 1c of the optical disc 1. A focusing servo of the optical pickup 24 is performed by the focus control unit 28a.

In the case where the optical disc 1 on which the spherical aberration correction data "De" has been recorded in the predetermined area on the inner rim side as shown in FIG. 8A is loaded in the information recording system, all of the spherical aberration correction data "De" included in a read signal S6 read by the optical pickup 24 is reproduced and stored in the storing unit 27 and, thereafter, the information recording operation is started.

When the information recording operation is started, the controller 16 subsequently detects a linear scanning position for the optical disc 1 of the optical pickup 24 on the basis of the read signal S6 read by the optical pickup 24 and compares the detected linear scanning position with the position data D(γ, φ) included in the spherical aberration correction data "De" recorded in the storing unit 27.

When the linear scanning position and the position data D(γ,φ) coincide, the thickness error data "We" corresponding to the position data D(γ, φ) is supplied from the storing unit 27 to the spherical aberration compensating unit 28b. The spherical aberration compensating unit 28b supplies a control signal S7 having the thickness error data "We" to a spherical compensation actuator (not shown) provided for the optical pickup 24. The spherical compensation actuator consequently adjusts a spherical compensation lens (not shown) provided for the optical pickup 24 in the optical axial direction on the basis of the thickness error data "We", thereby irradiating the laser beam without a spherical aberration in the in-focusing state into the recording layer 1b of the optical disc 1. Information is recorded into the recording layer 1b by the laser beam in the in-focusing state modulated by an information signal S8 to be recorded.

According to the information recording system as mentioned above, when the optical pickup 24 is located at the portion where the thickness error occurs on the optical disc 1, the laser beam without a spherical aberration is irradiated on the basis of the spherical aberration correction data "De" which has previously been read and stored in the storing unit 27, so that the occurrence of the spherical aberration can be automatically compensated. Further, even in the case where a value of NA of an objective lens provided for the optical pickup 24 is set to a high value, by automatically compensating the occurrence of the spherical aberration, the information recording system which can perform high density recording can be provided.

In the case where the optical disc 1 on which the spherical aberration correction data "De" has been dispersedly recorded as shown in FIGS. 8B and 8C is loaded in the information recording system, the spherical aberration correction data "De" is read and decoded in an interlocking relationship with the information recording. When the information is recorded in the portion where the thickness error exists, the laser beam without a spherical aberration is irradiated on the basis of the spherical aberration correction data "De" in a manner similar to that mentioned above. The occurrence of the spherical aberration can be, therefore, automatically compensated and an information recording system which can perform high density recording can be provided.

Since the information recording system has the construction common to the information recording apparatus which has been known hitherto, the information recording system which can perform high density recording can be realized without substantially changing the construction of the conventional information recording apparatus. Merely by reading the spherical aberration correction data "De" which has previously been recorded on the optical disc 1, the control signal S7 for compensating the spherical aberration can be generated, so that an information recording system which can perform information recording at a high speed can be provided.

A construction of an information reproducing system for reproducing information by using the optical disc 1 on which the spherical aberration correction data "De" has been recorded will now be described with reference to FIG. 10. Since the information reproducing system has a construction common to that of the information reproducing apparatus for reproducing information from the WORM-type or rewritable type optical disc, explanation will now be made here with respect to a construction of a main section as a characteristic portion of the invention.

Figure 10:
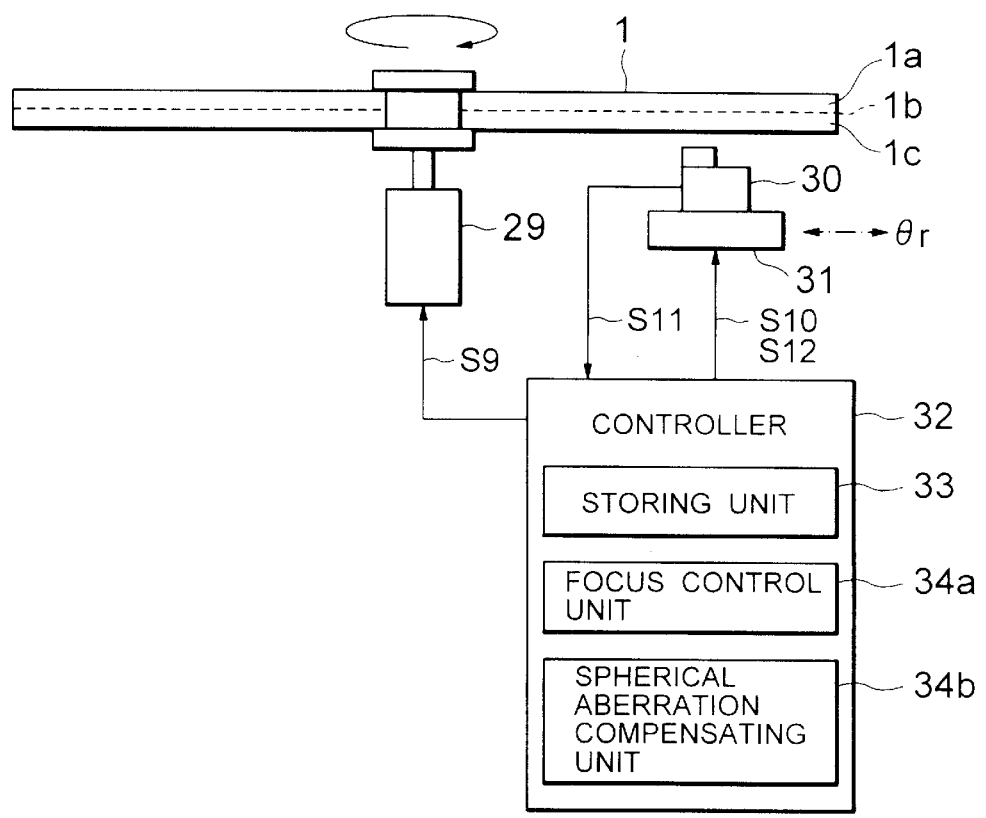
FIG. 10 is a block diagram showing a construction of an information reproducing system.

In FIG. 10, in a manner similar to the information reproducing apparatus which has been known hitherto, the information reproducing system is constructed by: a drive motor 29 which rotates while supporting the optical disc 1;

an optical pickup 30 for reproducing information; a conveying mechanism 31 for moving the optical pickup 30 forwardly or backwardly in the radial direction "r" of the optical disc 1; and a controller 32 for controlling the operation of the information reproducing system. Further, the controller 32 has the processing function corresponding to the optical disc 1 and a storing unit 33, a focus control unit 34a, and a spherical aberration compensating unit 34b are provided.

When the start of the information reproduction is instructed by the user or the like, the controller 32 rotates the drive motor 29 by a control signal S9 and moves the conveying mechanism 31 from the inner rim side to the outer rim side of the optical disc 1 by a control signal S10. While moving the optical pickup 30 at a predetermined linear velocity for the optical disc 1, thus, a laser beam (not shown) which is converged by an objective lens (not shown) in the optical pickup 30 is irradiated toward the transparent substrate 1c of the optical disc 1. A focusing servo of the optical pickup 30 is performed by the focus control unit 34a.

In the case where the optical disc 1 on which the spherical aberration correction data "De" has been recorded in the predetermined area on the inner rim side in a manner similar to that shown in FIG. 8A is loaded in the information reproducing system, all of the spherical aberration correction data "De" included in a read signal S11 read by the optical pickup 30 is reproduced and stored in the storing unit 33 and, thereafter, the information reproduction in the program area is started.

When the information reproducing operation is started, the controller 32 subsequently detects a linear scanning position for the optical disc 1 of the optical pickup 30 on the basis of the read signal S11 read by the optical pickup 30 and compares the detected linear scanning position with the position data $D(\gamma, \phi)$ included in the spherical aberration correction data "De" recorded in the storing unit 33.

When the linear scanning position and the position data $D(\gamma, \phi)$ coincide, the thickness error data "We" corresponding to the position data $D(\gamma, \phi)$ is supplied from the storing unit 33 to the spherical aberration compensating unit 34b. The spherical aberration compensating unit 34b supplies a control signal S12 having the thickness error data "We" to a spherical compensation actuator (not shown) provided for the optical pickup 30. The spherical compensation actuator consequently adjusts a spherical compensation lens (not shown) provided for the optical pickup 30 in the optical axial direction on the basis of the thickness error data "We", thereby irradiating the laser beam without a spherical aberration in the in-focusing state into the recording layer 1b of the optical disc 1. Information is subsequently read by the laser beam and the information is reproduced from the read signal S11 which was read out.

According to the information reproducing system, when the optical pickup 30 is located at the portion where the thickness error occurs on the optical disc 1, the laser beam without a spherical aberration is irradiated on the basis of the spherical aberration correction data "De" which has previously been read and stored in the storing unit 33, so that the occurrence of the spherical aberration can be automatically compensated. Further, even in the case where a value of NA of an objective lens provided for the optical pickup 30 is set to a high value, since the occurrence of the spherical aberration can be automatically compensated, the information reproducing system which can perform the information reproduction at a high speed can be provided.

In the case where the optical disc 1 on which the spherical aberration correction data "De" has been dispersedly recorded as shown in FIGS. 8B and 8C is loaded in the information reproducing system, the spherical aberration correction data "De" is read and decoded in an interlocking relationship with the information reproduction. When the information is reproduced from the portion where the thickness error exists, the laser beam without a spherical aberration is irradiated on the basis of the spherical aberration correction data "De" in a manner similar to that mentioned above. The occurrence of the spherical aberration can be automatically compensated, thus, and the information reproducing system which can reproduce the information recorded at a high density can be provided.

Since the information reproducing system has a construction common to the information reproducing apparatus, the information reproducing system which can reproduce the information recorded at a high density can be provided without substantially changing the construction of the conventional information reproducing apparatus. Merely by reading the spherical aberration correction data "De" which has previously been recorded on the optical disc 1, the control signal S12 for compensating the spherical aberration can be generated, so that the information reproducing system which can perform the information reproduction at a high speed can be provided.

Although the optical disc 1, forming apparatus, information recording system, and information reproducing system described above are provided for compensating the spherical aberration, the invention is not limited to the spherical aberration but incorporates a case where information of various optical characteristics existing in the optical disc 1 is preliminarily recorded on the optical disc.

For example, by previously recording an inclination of the transparent substrate 1c measured by the optical head 3 shown in FIG. 1 and a measurement value on the optical disc 1 by the optical head 4, when the information recording system or information reproducing system records or reproduces information into/from the portion such as inclination or warp of the optical disc which is caused by the substrate formation, it can be read as information, and a tilt compensation of the optical pickup provided for the information recording system or information reproducing system can be performed on the basis of the read information. Although the warp of the optical disc 1 changes depending on environmental conditions, by previously recording information of the warp of the optical disc at the time of initialization, a center value (standard value) of the compensation can be set to the warp upon processing and an angle error of the optical disc 1 at the time of operation can be averagely reduced.

It is also possible to measure information of birefringence of the optical disc and previously record the information onto the optical disc 1. In this case, it is possible to use a well-known birefringence measuring method such as method whereby the light transmitted through a polarizer is irradiated onto the transparent substrate 1c side of the optical disc 1 at the stage of completion of the formation of the optical disc 1, the light is transmitted through an analyzer, and intensity of the transmitted light is measured, method whereby the analyzer is rotated and a change in intensity of the transmitted light to a rotational angle is measured, or the like. It can be measured by using the transmitted light of the optical disc 1 or after a reflecting layer is adhered, it can be also measured with respect to the reflection light of the disc.

If the information of the birefringence is previously recorded on the optical disc as mentioned above, when the information recording or information reproduction is performed by the information recording system or information reproducing system, the recorded information of an index of birefringence is optically read and, further, the reflection light amount to be reduced can be compensated by using the read-out information of the index of birefringence, or an offset of a servo error signal which is generated when the objective lens of high NA is used can be compensated.

The invention can be also used for the purpose of compensating a variation of film forming characteristics of the optical disc 1. For example, by previously recording optical characteristics (a reflectance for the laser beam, a recommended recording power of the laser beam, a recommended reproducing power of the laser beam, a recommended strategy pattern, and the like) of each portion of the recording layer 1b of the optical disc 1 onto the optical disc 1, when the information recording or information reproduction is performed by the information recording system or information reproducing system, the recorded information of the optical characteristics is read out every portion of the recording layer 1b, and the compensating process can be performed on the basis of the read-out optical information.

Figure 12:
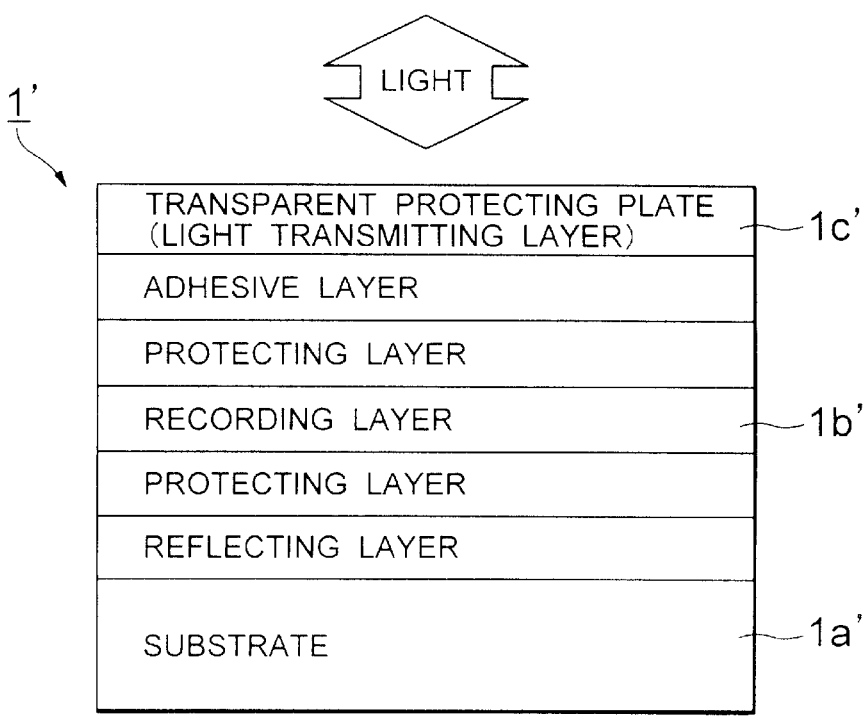
FIG. 12 is a cross sectional view schematically showing a cross sectional structure of another optical disc.

Although the embodiment has been described with respect to the case of using the optical disc having the fundamental structure shown in FIG. 11, the invention is not limited to the optical disc with the structure. For example, an optical disc 1' having a fundamental structure as schematically shown in a cross sectional view of FIG. 12 can be used. That is, the optical disc 1' has a laminated structure comprising: a relatively thick substrate 1a' for supporting the optical disc 1' itself; a transparent protecting plate 1c' which is thinner than the substrate 1a' and serves as a light transmitting layer for transmitting light from the outside; and a recording layer 1b' which is arranged between the substrate 1a' and transparent protecting plate 1c' and in which information is recorded. In case of the optical disc 1' with the structure, information of the optical characteristics regarding a thickness error or the like of the transparent protecting plate 1c' is previously recorded in the recording layer 1b' by the forming apparatus. The information recording system and information reproducing system reproduce the information of the optical characteristics regarding a thickness error or the like of the transparent protecting plate 1c', so that the spherical aberration can be compensated.

As described above, according to the information recording medium of the invention, since the information regarding the optical characteristics has previously been recorded, when the information recording is performed by the information recording system, the information recording system previously optically reads the information regarding the optical characteristics and the compensating process for properly performing the information recording can be performed on the basis of the read information regarding the optical characteristics. For example, consequently, even in the case where a value of NA of an objective lens provided for the information recording system is set to a high value in association with the realization of the high density of the information recording medium, the objective lens can be automatically properly adjusted on the basis of the optical characteristics, thereby enabling the high density recording to the information recording medium to be performed.

Since the information regarding the optical characteristics has previously been recorded, a special apparatus for detecting the optical characteristics does not need to be provided on the information recording system side. For example, consequently, the construction of the information recording system can be simplified and the occurrence of a processing delay which is caused for detecting the optical characteristics or the like can be prevented.

According to the forming apparatus of the information recording medium of the invention, the optical characteristics of the information recording medium are measured and the measured information is recorded on the information recording medium. When the information is, therefore, recorded on the information recording medium by the information recording system or when the information reproduction is performed by the information recording system, the information reproducing system or information recording system previously optically reads the information regarding the optical characteristics, thereby enabling the compensating process for properly performing the information recording to be performed on the basis of the read information regarding the optical characteristics. For example, consequently, even in the case where the value of NA of the objective lens provided for the information recording system or information reproducing system is set to a high value in association with the realization of the high density of the information recording medium, the optical element such as a spherical compensation lens or the like can be automatically properly adjusted on the basis of the optical characteristics, thereby enabling the high density information recording by the information recording system to be performed or enabling the proper information reproduction by the information reproducing system from the information recording medium on which the information has been recorded at a high density to be performed.

According to the information recording system of the invention, when the information is recorded on the information recording medium on which the information regarding the optical characteristics has previously been recorded, the information regarding the optical characteristics is optically read out from the information recording medium, a deviation of the optical characteristics that is caused at the time of the information recording to the information recording medium is compensated on the basis of the read information regarding the optical characteristics, and the information recording can be performed. Even if the value of NA of the objective lens is set to a high value, therefore, the optical element such as a spherical compensation lens or the like can be automatically properly adjusted on the basis of the optical characteristics, thereby enabling the high density information recording to be performed.

According to the information reproducing system of the invention, when the information is reproduced from the information recording medium on which the information regarding the optical characteristics has previously been recorded, the information regarding the optical characteristics is optically read out from the information recording medium, a deviation of the optical characteristics that is caused at the time of the information reproduction from the information recording medium is compensated on the basis of the read information regarding the optical characteristics, and the information reproduction can be performed. Even if the value of NA of the objective lens is set to a high value, therefore, the objective lens can be automatically properly adjusted on the basis of the optical characteristics, thereby enabling the information to be properly reproduced from the information recording medium on which the information has been recorded at a high density. Since the information regarding the optical characteristics has previously been recorded on the information recording medium, a special apparatus for detecting the optical characteristics does not need to be provided on the information reproducing system side. For example, consequently, the construction of the information reproducing system can be simplified and the occurrence of a processing delay which is caused for detecting the optical characteristics or the like can be prevented.

What is claimed is:

1. An information recording medium having a light transmitting layer and a recording layer in which at least one of information recording to and an information reproduction from said recording layer is performed by a light irradiated from a light transmitting layer side of said light transmitting layer by one of an information recording system and an information reproducing system, wherein information regarding at least optical characteristics of said light transmitting layer has previously been recorded in said recording layer.

2. An information recording medium according to claim 1, wherein the information regarding said optical characteristics is collectively recorded in a predetermined area of said recording layer.

3. An information recording medium according to claim 1, wherein the information regarding said optical characteristics is dispersedly recorded in said recording layer.

4. An information recording medium according to claim 1, wherein the information regarding said optical characteristics is recorded in said recording layer of a portion corresponding to a portion regarding said optical characteristics.

5. An information recording medium according to claim 1, wherein said information regarding said optical characteristics includes at least information of a thickness error of each portion of said light transmitting layer.

6. An apparatus for forming an information recording medium having a light transmitting layer and a recording layer in which at least one of information recording to and an information reproduction from said recording layer is performed by a light irradiated from a light transmitting layer side of said light transmitting layer by one of an information recording system and an information reproducing system, comprising:

measuring means for measuring optical characteristics of said information recording medium; and recording means for previously recording measurement information measured by said measuring means into said recording layer.

7. An apparatus according to claim 6, wherein said recording means collectively records information regarding said optical characteristics into a predetermined area of said recording layer.

8. An apparatus according to claim 6, wherein said recording means dispersedly records information regarding said optical characteristics into said recording layer.

9. An apparatus according to claim 6, wherein said recording means records information regarding said optical characteristics into said recording layer of a portion corresponding to a portion regarding said optical characteristics.

10. An apparatus according to claim 6, wherein said recording means previously records at least information of a thickness error of each portion of said light transmitting layer as said information regarding said optical characteristics.

11. An information recording system for recording information to an information recording medium which has a light transmitting layer and a recording layer and in which information regarding at least optical characteristics of said light transmitting layer has previously been recorded in said recording layer, comprising:

reading means for optically reading the information regarding said optical characteristics recorded in said recording layer; and optical characteristics compensating means for compensating a deviation of the optical characteristics which is caused when the information is recorded to said information recording medium on the basis of the information regarding said optical characteristics read by said reading means and performing the information recording.

12. An information reproducing system for reproducing information from an information recording medium having a light transmitting layer and a recording layer and in which the information regarding at least optical characteristics of said light transmitting layer has previously been recorded in said recording layer, comprising:

reading means for optically reading the information regarding said optical characteristics recorded in said recording layer; and optical characteristics compensating means for compensating a deviation of the optical characteristics which is caused when the information is reproduced from said information recording medium on the basis of the information regarding said optical characteristics read by said reading means and performing the information reproduction.

* * * * *